US012578624B2

(12) United States Patent
Su et al.

(10) Patent No.: US 12,578,624 B2
(45) Date of Patent: Mar. 17, 2026

(54) OPTICAL ELEMENT DRIVING MECHANISM

(71) Applicant: TDK TAIWAN CORP., Taoyuan City (TW)

(72) Inventors: Xuan-Huan Su, Taoyuan City (TW); Yu-Chi Kuo, Taoyuan City (TW); Yung-Yun Chen, Taoyuan City (TW); Yi-Ho Chen, Taoyuan City (TW); Ying-Jen Wang, Taoyuan City (TW)

(73) Assignee: TDK TAIWAN CORP., Taoyuan City (TW)

( * ) Notice: Subject to any disclaimer, the term of this patent is extended or adjusted under 35 U.S.C. 154(b) by 599 days.

(21) Appl. No.: 18/156,182

(22) Filed: Jan. 18, 2023

(65) Prior Publication Data

US 2023/0288658 A1     Sep. 14, 2023

Related U.S. Application Data

(60) Provisional application No. 63/303,744, filed on Jan. 27, 2022.

(51) Int. Cl.
*G03B 9/06*        (2021.01)
*G01B 7/00*        (2006.01)
*G02B 7/00*        (2021.01)
*G02B 27/00*       (2006.01)

(52) U.S. Cl.
CPC .............. *G03B 9/06* (2013.01); *G01B 7/003* (2013.01); *G02B 7/005* (2013.01); *G02B 27/0012* (2013.01)

(58) Field of Classification Search
CPC . G03B 9/06; G03B 3/10; G03B 30/00; G01B 7/003; G02B 7/005; G02B 27/0012; G02B 7/00
USPC ......................................................... 359/819
See application file for complete search history.

(56) References Cited

U.S. PATENT DOCUMENTS

2007/0211353 A1*  9/2007  Lin ........................ G02B 7/025
                                                                      359/811
2011/0141340 A1*  6/2011  Yumiki .................... G02B 7/08
                                                                      359/699

FOREIGN PATENT DOCUMENTS

CN         115704964        2/2023

OTHER PUBLICATIONS

An Office Action in corresponding CN Application No. 202320140256.7 dated May 11, 2023 is attached, 1 page.

* cited by examiner

*Primary Examiner* — Travis S Fissel
(74) *Attorney, Agent, or Firm* — MUNCY, GEISSLER, OLDS & LOWE, P.C.

(57) ABSTRACT

An optical element driving mechanism is provided. The optical element driving mechanism includes a movable portion, a fixed portion and a sensing assembly. The movable portion is connected with an optical element. The movable portion is movable relative to the fixed portion. The sensing assembly senses whether the movable portion is in a first position relative to the fixed portion.

19 Claims, 12 Drawing Sheets

OPTICAL ELEMENT DRIVING MECHANISM

CROSS REFERENCE TO RELATED APPLICATIONS

This application claims the benefit of U.S. Provisional Application No. 63/303,744 filed 27 Jan. 2022, the entirety of which is incorporated by reference herein.

BACKGROUND OF THE INVENTION

Field of the Invention

The present invention relates to an optical element driving mechanism, and more particularly to an optical element driving mechanism with a sensing assembly.

Description of the Related Art

As technology has developed, it has become more common to include image-capturing and video-recording functions into many types of modern electronic devices, such as notebooks, smartphones or digital cameras. These electronic devices are used more and more often, and new models have been developed that are convenient, thin, and lightweight, offering more choices for consumers.

Electronic devices that have image-capturing or video-recording functions normally include a driving mechanism to drive an optical element to move. Light may pass through the optical element and may form an image on an optical sensor. How to miniaturize the optical element driving mechanism and improve the flatness of the mechanism is an important issue.

BRIEF SUMMARY OF THE INVENTION

An optical element driving mechanism is provided. The optical element driving mechanism includes a movable portion, a fixed portion and a sensing assembly. The movable portion is connected with an optical element. The movable portion is movable relative to the fixed portion. The sensing assembly senses whether the movable portion is in a first position relative to the fixed portion.

In some embodiments of the present disclosure, the movable portion includes a first opening and a second opening. The area of the first opening is different from the area of the second opening. In some embodiments of the present disclosure, the first opening is larger than the second opening.

In some embodiments of the present disclosure, the sensing assembly includes a first magnetic element and a second magnetic element. The first magnetic element and the second magnetic element are arranged on both sides of the first opening of the movable portion. The second magnetic element is disposed between the first opening and the second opening.

In some embodiments of the present disclosure, the optical element driving mechanism further includes a circuit component, the fixed portion includes a plane, and the sensing assembly includes a sensing element. The circuit component is disposed on the plane of the fixed portion. The sensing element is disposed on the circuit component.

In some embodiments of the present disclosure, the circuit component includes a first positioning structure and a second positioning structure. The first positioning structure and the second positioning structure are different in area and shape.

In some embodiments of the present disclosure, the fixed portion includes a first end and a second end. A direction in which the first positioning structure and the second positioning structure are arranged is not parallel to a direction from the first end to the second end. The distance between the sensing element and the first end is smaller than the distance between the first positioning structure and the first end.

In some embodiments of the present disclosure, the fixed portion includes a first protrusion and a second protrusion. The first protrusion extends through the first positioning structure. The second protrusion extends through the second positioning structure.

In some embodiments of the present disclosure, the first positioning structure includes two edges. The edges of the first positioning structure are in contact with the first protrusion.

In some embodiments of the present disclosure, the sensing assembly includes a first magnetic element and a second magnetic element. The first magnetic element and the second magnetic element are disposed on the movable portion. The magnetic poles of the first magnetic element and the second magnetic element are arranged in opposite directions.

In some embodiments of the present disclosure, the optical element driving mechanism further includes a first adhesive element. The sensing assembly includes a first magnetic element. The first adhesive element is disposed between the first magnetic element and the movable portion. The first adhesive element is cured by thermosetting.

In some embodiments of the present disclosure, the optical element driving mechanism further includes a second adhesive element. The second adhesive element is disposed on the edge of the first magnetic element. The second adhesive element is cured by ultraviolet curing.

In some embodiments of the present disclosure, the Young's modulus of the first adhesive element after curing is greater than the Young's modulus of the second adhesive element after curing.

In some embodiments of the present disclosure, the movable portion includes a first opening, a first fixed structure, and a second fixed structure. The sensing assembly includes a first magnetic element and a second magnetic element. The first fixed structure and the second fixed structure extend in a first axis from both sides of the first opening. The first magnetic element is disposed on the first fixed structure. The second magnetic element is disposed on the second fixed structure.

In some embodiments of the present disclosure, the height of the first magnetic element in the first axis is greater than the height of the first fixed structure in the first axis. The height of the second magnetic element in the first axis is greater than the height of the second fixed structure in the first axis. The first axis is perpendicular to a direction from the first magnetic element to the second magnetic element.

In some embodiments of the present disclosure, the fixed portion includes a first end, a second end, a first support portion, and a second support portion. The first end is opposite to the second end. The distance between the sensing assembly and the first end is smaller than the distance between the sensing assembly and the second end. The distance between the first support portion and the first end is smaller than the distance between the second support portion and the first end. A first gap is formed between the first support portion and the movable portion. A second gap is formed between the second support portion and the movable portion.

In some embodiments of the present disclosure, the first gap is smaller than the second gap, and the first gap is closer to the first end than the second gap.

In some embodiments of the present disclosure, the optical element driving mechanism further includes a circuit component. The fixed portion includes an opening, a plane, and a bottom. The sensing assembly includes a sensing element. The opening runs through the bottom from the plane. The plane and the bottom of the fixed portion are on different levels. The circuit component is disposed on the bottom of the fixed portion. The sensing element is electrically connected to the circuit component, and sensing element is positioned in the opening.

In some embodiments of the present disclosure, the sensing element and an optical module are both disposed on the circuit component.

In some embodiments of the present disclosure, the fixed portion includes a first end, a second end, a first side wall, and a second side wall. The first end is opposite to the second end. The distance between the sensing assembly and the first end is smaller than the distance between the sensing assembly and the second end. The distance between the first side wall and the first end is smaller than the distance between the second side wall and the first end. The height of the first side wall in a first axis is greater than the height of the second side wall in the first axis. The first axis is perpendicular to a direction extending from the first end to the second end.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

In order to make the purpose, features, and advantages of the present disclosure more obvious and understandable, the following embodiments are specially cited, and the accompanying drawings are used for detailed description. Among them, the configuration of each element in the embodiment is for illustrative purposes, and is not intended to limit the disclosure. In addition, part of the repetition of the reference numbers in the embodiments is for simplifying the description, and does not mean the relevance between different embodiments. The directional terms mentioned in the following embodiments, for example: up, down, left, right, front or back, etc., are only directions for referring to the attached drawings. Therefore, the directional terms used are used to illustrate and not to limit the disclosure.

In addition, relative terms such as "lower" or "bottom" and "higher" or "top" may be used in the embodiments to describe the relative relationship between one element of the illustration and another element. It can be understood that if the illustrated device is turned upside down, the elements described on the "lower" side will become the elements on the "higher" side.

The optical element driving mechanism of the embodiment of the present invention is described below. However, it can be easily understood that the embodiments of the present invention provide many suitable inventive concepts and can be implemented in a wide variety of specific backgrounds. The specific embodiments disclosed are only used to illustrate the use of the present invention in a specific method, and are not used to limit the scope of the present invention. Unless otherwise defined, all terms used here (including technical and scientific terms) have the same meanings commonly understood by the general artisans to whom the disclosures in this article belong. It is understandable that these terms, such as the terms defined in commonly used dictionaries should be interpreted as having a meaning consistent with the relevant technology and the background or context of this disclosure, and should not be interpreted in an idealized or excessively formal way, unless specifically defined herein.

Figure 1:
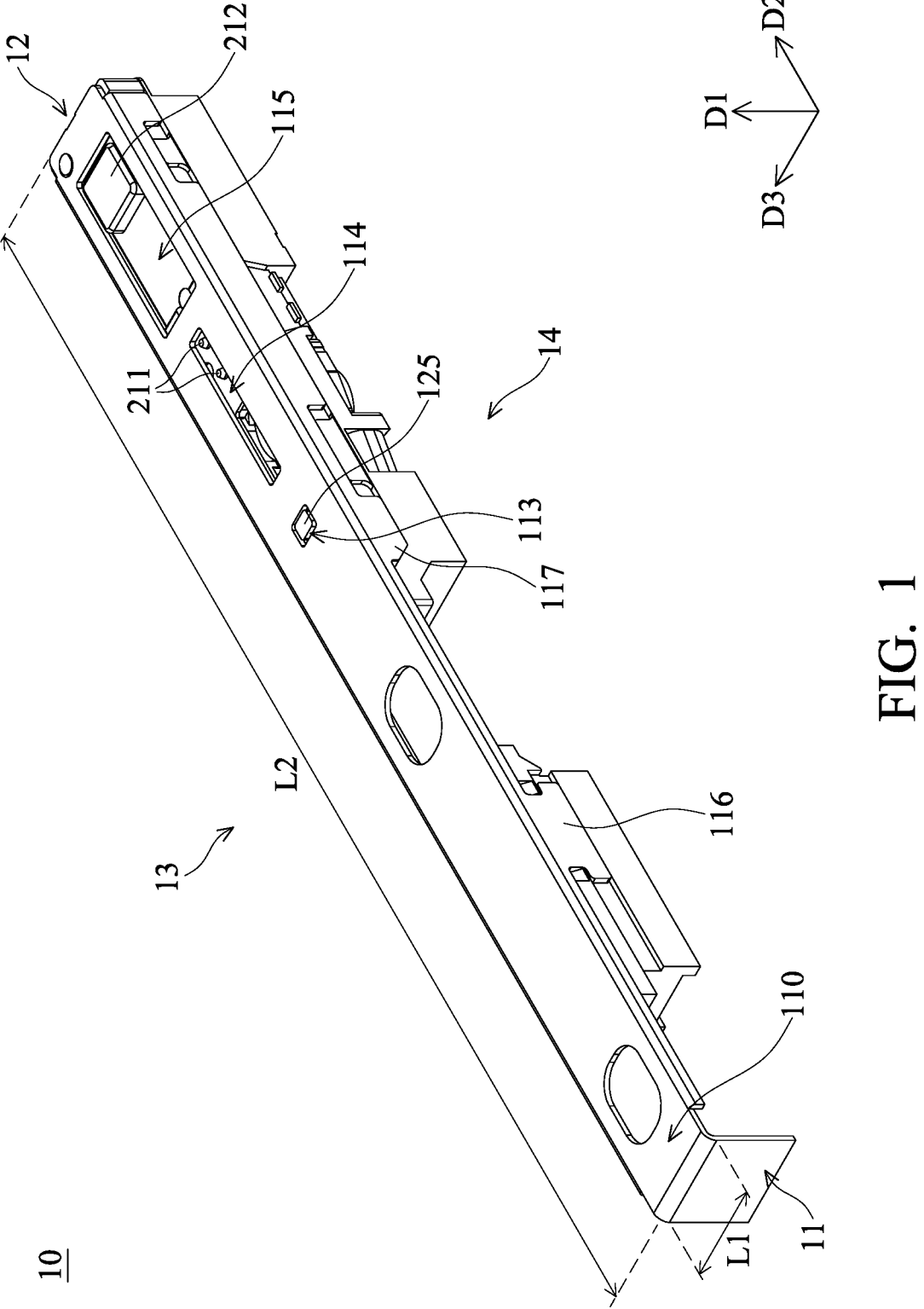
FIG. 1 is a perspective view of an optical element driving mechanism according to some embodiments of the present disclosure.
Figure 2:
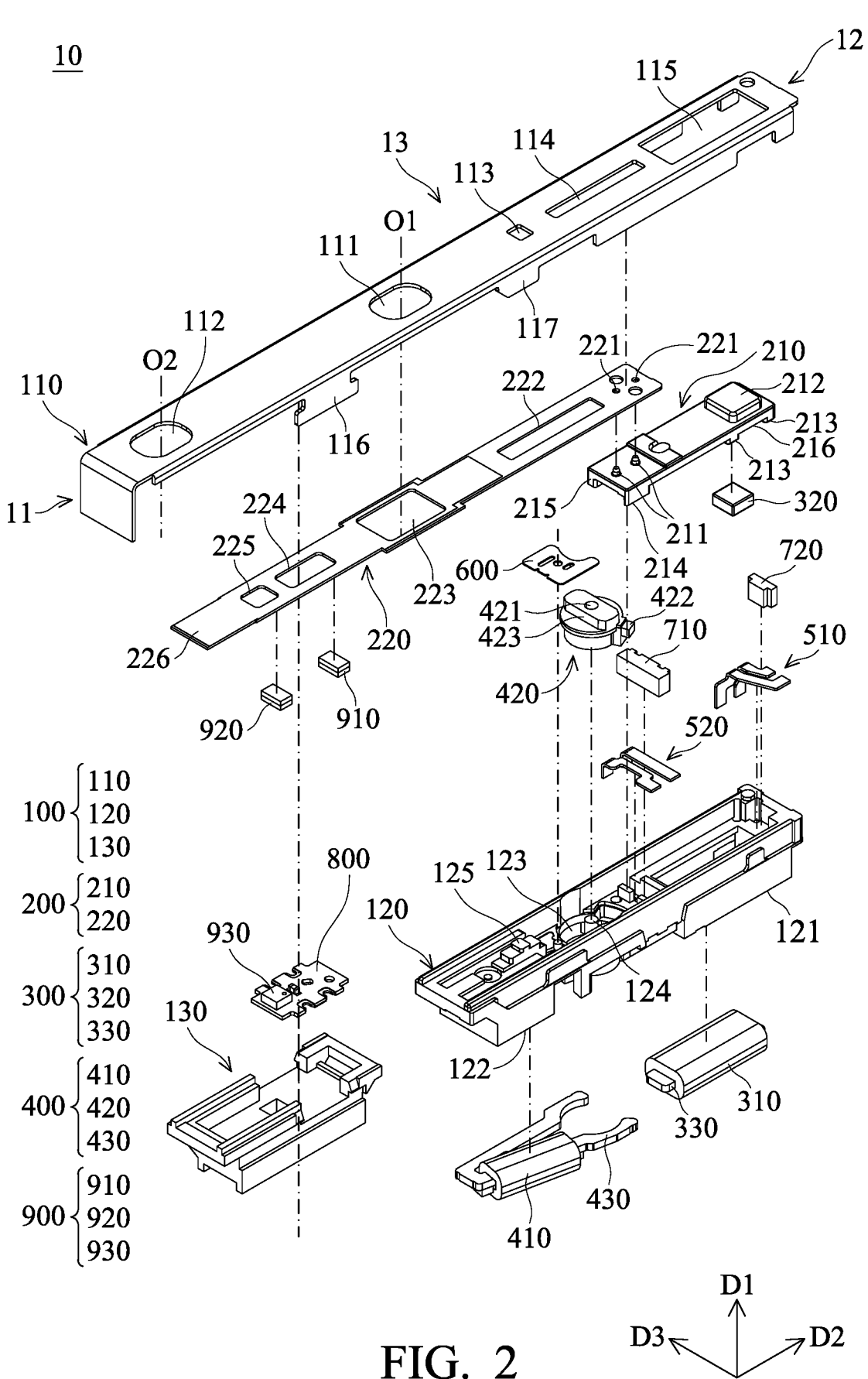
FIG. 2 is an exploded view of the optical element driving mechanism according to some embodiments of the present disclosure.

Please refer to FIG. 1, which is a perspective view of an optical element driving mechanism 10 according to some embodiments of the present disclosure. The optical element driving mechanism 10 is generally in the shape of a long rectangle. FIG. 2 is an exploded view of the optical element driving mechanism 10 according to some embodiments of the present disclosure. Please refer to FIG. 1 to FIG. 2 below.

Figure 5:
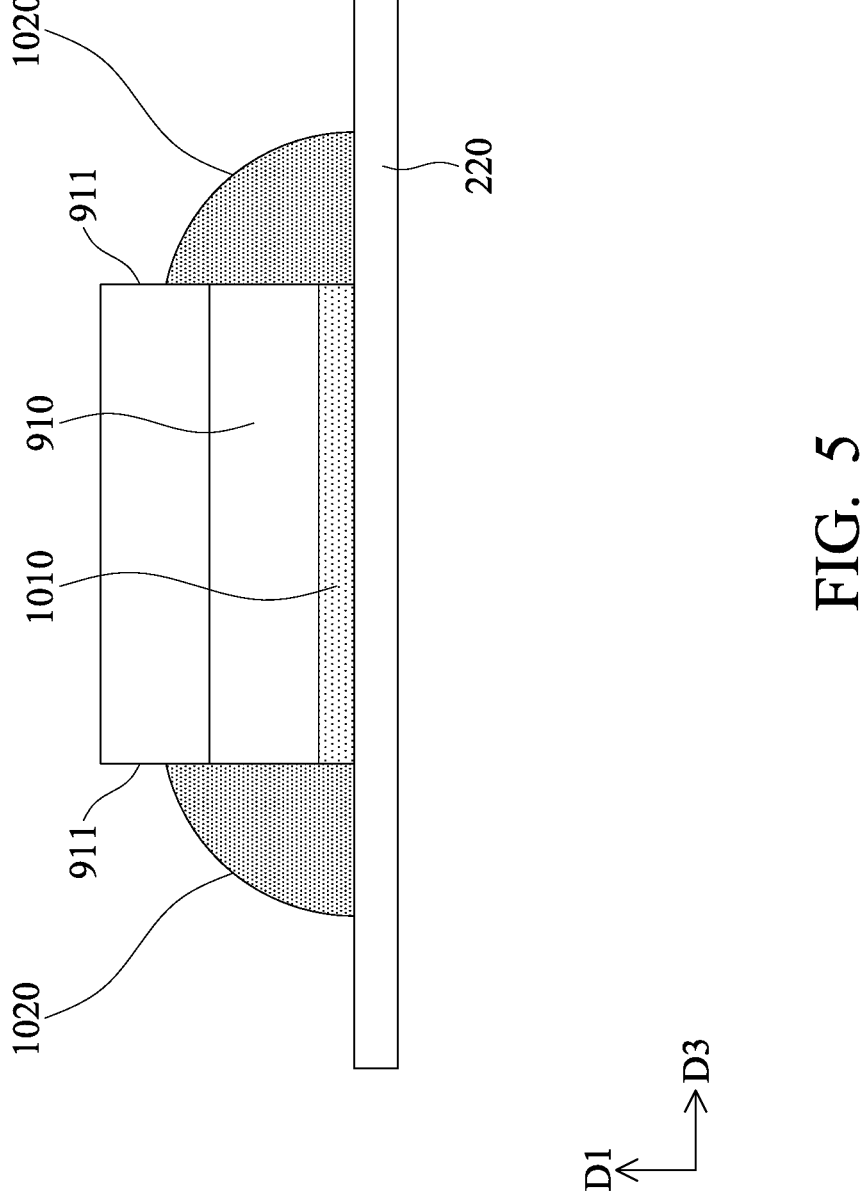
FIG. 5 shows a schematic view of a first magnetic element disposed on a holder.

The optical element driving mechanism 10 includes a fixed portion 100, a movable portion 200, a driving assembly 300, a driving assembly 400, a first terminal 510, a second terminal 520, a stopper element 600, two buffer elements 710 and 720, a circuit component 800, a sensing assembly 900, a plurality of first adhesive elements 1010 (FIG. 5), and a plurality of second adhesive elements (FIG. 5).

According to some embodiments of the present disclosure, the fixed portion 100 includes a housing 110, a base 120 and a base 130. A first end 11, a second end 12, a side portion 13 and a side portion 14 of the housing 110 can be seen from FIG. 1.

The first end 11 and the second end 12 are two opposite ends. The length L1 of the first end 11 is smaller than the length L2 of the side portion 13. When viewed along a first axis D1, the optical element driving mechanism 10 has an elongated structure extending along a second axis D2. The first axis D1 is perpendicular to the second axis D2.

The housing 110 includes five openings 111, 112, 113, 114, 115, a pair of first side walls 116 and a pair of second side walls 117. The opening 111 is configured to correspond to a light traveling along an optical axis O1, the opening 112 is configured to correspond to a light traveling along an optical axis O2. The optical axis O1 and the optical axis O2 are parallel to the first axis D1. Details of the openings 111, 112, 113, 114, 115 and the first sidewall 116 and the second sidewall 117 is described in detail below.

The first side wall 116 is connected to the base 130 and the second side wall 117 is connected to the base 120. The distance between the first sidewall 116 and the first end 11 is smaller than the distance between the second sidewall 117 and the first end 11. The height of the first sidewall 116 in the first axis D1 is greater than the height of the second sidewall 117 in the first axis D1. This configuration not only improves the rigidity of the housing 110 but also improves the flatness of the optical element driving mechanism 10.

According to some embodiments of the present disclosure, the base 120 and the base 130 are each connected to the housing 110 to accommodate other elements in the optical element driving mechanism 10. The base 120 includes three accommodating spaces 121, 122, 123, a post 124, and a bump 125, details of which is described in detail below. The accommodating spaces 121 and 122 are located in the lower part of the base 120.

The movable portion 200 has an elongate structure and extends along the second axis D2. The movable portion 200 includes two holders 210, 220 that is connected together. The holder 210 includes two connecting parts 211, a bump 212, a group of bumps 213, a first protrusion 214, a second protrusion 215 and a groove 216. The holder 220 includes two holes 221, two openings 222, 223, a first opening 224, a second opening 225, and a shielding portion 226.

The connecting part 211 connects the holder 210 to holder 220 by passing through the hole 221. The bump 125 of the base 120 may pass through the opening 222 of the holder 220 and be exposed from the opening 113 of the housing 110 as shown in FIG. 1. The connection part 211 is exposed from the opening 114 of the housing 110 as shown in FIG. 1. The bump 212 is exposed from the opening 115 of the housing 110 as shown in FIG. 1.

The opening 223 may be connected to a blade, a lens, a filter, a neutral filter, a polarizer, etc. Alternatively, the opening 223 may be an opening for passing light, depending on design requirements. Similarly, the shielding portion 226 may be connected to a blade, a lens, a filter, a neutral filter, a polarizer, etc., depending on design requirements.

According to some embodiments of the present disclosure, the area of the first opening 224 is larger than the area of the second opening 225. The configuration with the first opening 224 and the second opening 225 may reduce the weight of the holder 220 to achieve the effect of lightening the movable portion 200.

According to some embodiments of the present disclosure, the driving assembly 300 is configured to drive the movable portion 200 to move relative to the fixed portion 100 in a first dimension. The first dimension is movement along the second axis D2. The driving assembly 300 includes a coil 310, a magnetic element 320, and a magnetically permeable element 330.

The coil 310 is wound around the magnetically permeable element 330. The coil 310 and the magnetic permeable element 330 are disposed in the accommodating space 121 of the base 120. The magnetic element 320 is disposed in the groove 216 of the holder 210. The coil 310 and the magnetically permeable element 330 correspond to the magnetic element 320.

That is to say, when a driving signal is applied to the driving assembly 300, for example, a current is applied by an external power supply, a magnetic force is generated between the magnetic element 320 and the coil 310, thereby driving the movable portion 200 to move relative to the fixed portion 100.

The magnetically permeable element 330 is made of a magnetically permeable material, for example, a material with high magnetic permeability such as a ferromagnetic material. The magnetically permeable element 330 is configured to concentrate the magnetic force generated between the magnetic element 320 and the coil 310.

According to some embodiments of the present disclosure, the driving assembly 400 includes a coil 410, a magnetic element 420 and a magnetic permeable element 430. The coil 410 and the magnetic permeable element 430 are disposed in the accommodating space 122 of the base 120. The magnetic element 420 is disposed in the accommodating space 123 of the base 120.

The coil 410 is wound around the magnetically permeable element 430. The magnetically permeable element 430 is made of a magnetically permeable material, for example, a material with high magnetic permeability such as a ferromagnetic material. The magnetically permeable element 430 is configured to concentrate the magnetic force generated between the magnetic element 420 and the coil 410.

The coil 410 and the magnetically permeable element 430 correspond to the magnetic element 420. That is to say, when a driving signal is applied to the driving assembly 400, for example, a current is applied by an external power supply, a magnetic force is generated between the magnetic element 420 and the coil 410, thereby driving the magnetic element 420 to move relative to the fixed portion 100 in a second dimension. The second dimension is the rotation around a rotating shaft (post 124), and the rotating shaft is parallel to the first axis D1.

According to some embodiments of the present disclosure, the magnetic element 420 may serve as a limiting element, so that the optical element driving mechanism 10 may keep the holder 210 within a certain range of positions even when the optical element driving mechanism 10 is subjected to an impact force. In detail, the magnetic element 420 includes a through hole 421, a stopper 422 and a protrusion 423.

The post 124 of the base 120 passes through the through hole 421 of the magnetic element 420, so that the magnetic element 420 is rotatable around the post 124. The stopper 422 of the magnetic element 420 corresponds to the accommodating space 123 of the base 120, so that the rotation of the magnetic element 420 is limited between a locked position and an unlocked position. The protrusion 423 corresponds to the first protrusion 214 and the second protrusion 215 of the holder 210.

When the magnetic element 420 is in the locked position, the protrusion 423 is not parallel to the second axis D2, so that with the interference of the first protrusion 214 or the second protrusion 215, the movable portion 200 may neither move from a first position (FIG. 3A) to a second position (FIG. 3B), nor move from the second position to the first position.

Figure 3A:
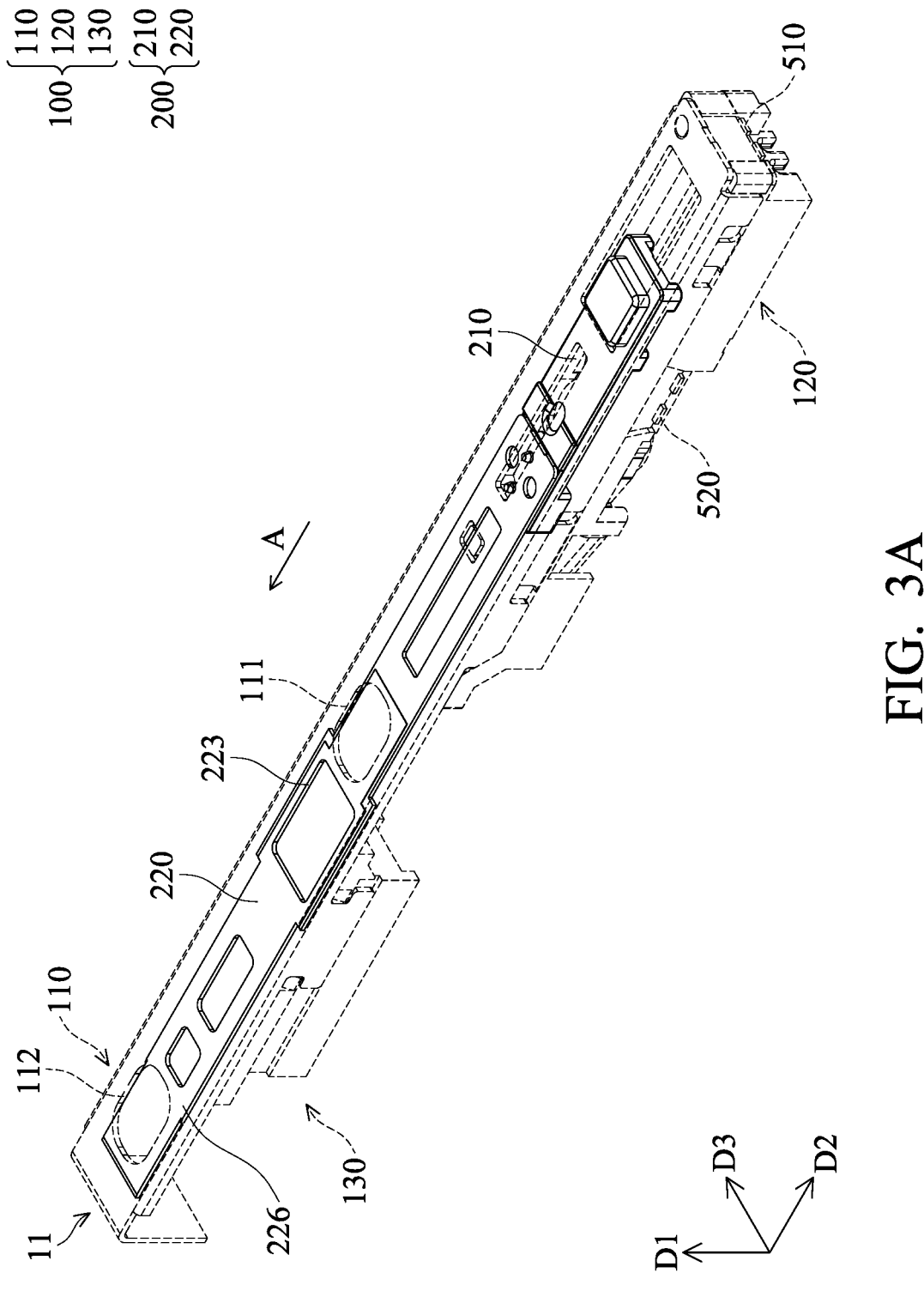
FIG. 3A shows a perspective view of a movable portion in a first position relative to a fixed portion, with a housing shown in dash line for illustrative purposes.
Figure 3B:
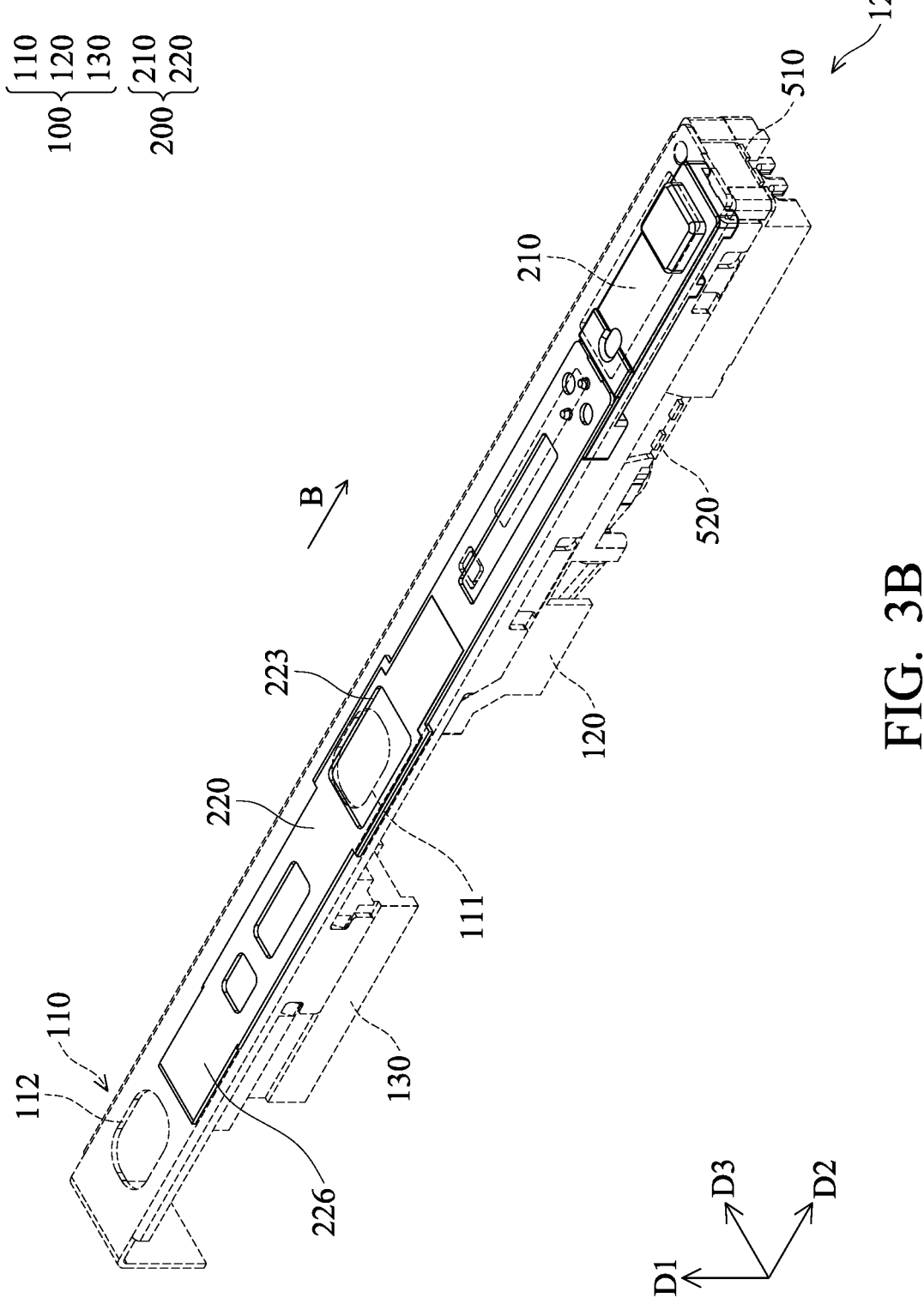
FIG. 3B shows a perspective view of the movable portion in a second position relative to the fixed portion, with the housing shown in dash line for illustrative purposes.

On the contrary, when the magnetic element 420 is rotated to the unlock position, the protrusion 423 is parallel to the second axis D2, so that the movable portion 200 may be driven by the driving assembly 300 to move from the first position in FIG. 3A to the second position in FIG. 3B, or move from the second position to the first position.

According to some embodiments of the present disclosure, the first terminal 510 and the second terminal 520 are embedded in the base 120. The driving assembly 300 is electrically connected to an external circuit (not shown) through the first terminal 510. The driving assembly 400 is electrically connected to an external circuit through the second terminal 520.

According to some embodiments of the present disclosure, the stopper element 600 is disposed on the base 120. The stopper element 600 has a plate-like structure perpendicular to the first axis D1. The stopper element 600 is configured to limit the motion range of the magnetic element 420. Specifically, the stopper element 600 prevents the magnetic element 420 from moving along the first axis D1 when receiving an impact force.

According to some embodiments of the present disclosure, both the buffer elements 710 and 720 are disposed on the base 120. According to some embodiments of the present disclosure, the circuit component 800 is disposed under of the base 130, the details of which is described in detail with respect to FIGS. 6A to 6B.

According to some embodiments of the present disclosure, the sensing assembly 900 includes a first magnetic element 910, a second magnetic element 920 and a sensing element 930. The first magnetic element 910 and the second magnetic element 920 are disposed on the lower surface of the holder 220 facing the base 130. The first magnetic element 910 and the second magnetic element 920 are positioned with respect to the first opening 224 and the second opening 225.

Specifically, the first magnetic element 910 and the second magnetic element 920 are disposed on two sides of the first opening 224 of the movable portion 200. The second magnetic element 920 is disposed between the first opening 224 and the second opening 225. The sensing element 930 is disposed on the circuit component 800. The distance between the sensing element 930 and the first end 11 is smaller than the distance between the sensing element 930 and the second end 12.

FIG. 3A shows a perspective view of the movable portion 200 in the first position relative to the fixed portion 100, with the housing 110 shown in dash line for illustrative purposes. FIG. 3B shows a perspective view of the movable portion 200 in the second position relative to the fixed portion 100, with the housing 110 shown in dash line for illustrative purposes.

Referring to FIG. 3A, the movable portion 200 may be driven by the driving assembly 300 (FIG. 2) to move along a first direction A to the first position. When the movable portion 200 moves to the first position close to the first end 11, the movable portion 200 contacts the buffer element 710 (FIG. 2), the opening 223 does not overlap with the opening 111 in the direction of the first axis D1, and the shielding portion 226 overlaps with the opening 112 in the direction of the first axis D1.

Referring to FIG. 3B, the movable portion 200 may be driven by the driving assembly 300 (FIG. 2) to move along a second direction B to the second position. When the movable portion 200 moves to the second position close to the second end 12, the movable portion 200 contacts the buffer element 720 (FIG. 2), and the opening 223 overlaps with the opening 111 in the direction of the first axis D1, and the shielding portion 226 does not overlap with the opening 112 in the direction of the first axis D1.

Figures 4A, 4B:
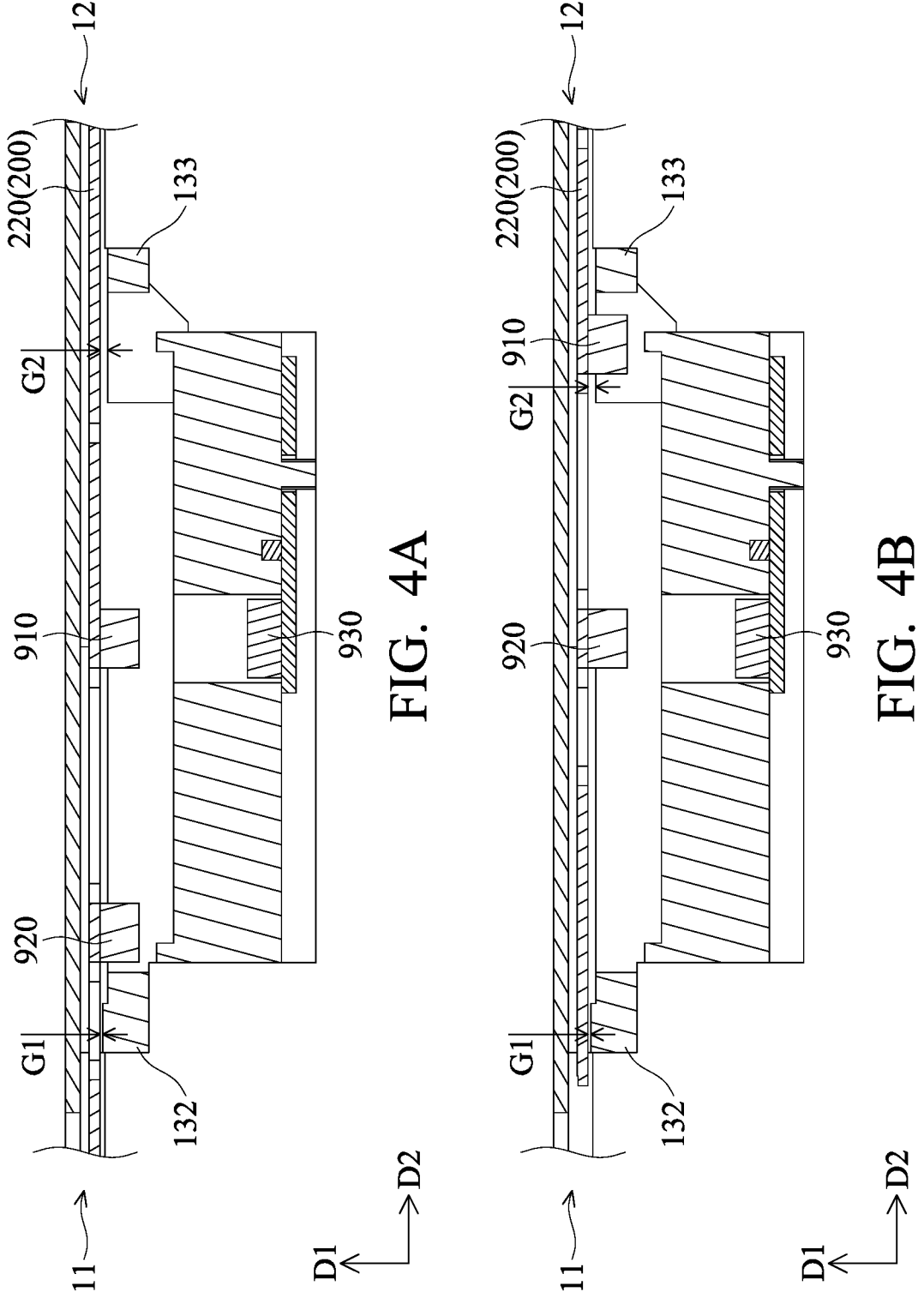
FIG. 4A shows a partial side view of the optical element driving mechanism in the first position according to some embodiments of the present disclosure.
FIG. 4B shows a partial side view of the optical element driving mechanism in the second position according to some embodiments of the present disclosure.

FIG. 4A shows a partial side view of the optical element driving mechanism 10 in the first position according to some embodiments of the present disclosure. FIG. 4B shows a partial side view of the optical element driving mechanism 10 in the second position according to some embodiments of the present disclosure.

As shown in FIG. 4A, when the movable portion 200 moves to the first position, the first magnetic element 910 and the sensing element 930 are aligned in the first axis D1. As shown in FIG. 4B, when the movable portion 200 moves to the second position, the second magnetic element 920 is aligned with the sensing element 930 in the first axis D1.

It should be noted that the magnetic poles of the first magnetic element 910 and the second magnetic element 920 are arranged in opposite directions. For example, the magnetic pole of the first magnetic element 910 facing the sensing element 930 is N pole, and the magnetic pole of the second magnetic element 920 facing the sensing element 930 is S pole. In this way, the sensing element 930 may determine whether the movable portion 200 is in the first position relative to the fixed portion based on the sensed change of the magnetic field converted into a change of the output voltage, thereby achieving closed-loop control.

FIG. 5 shows a schematic view of the first magnetic element 910 disposed on the holder 220. As shown in FIG. 5, the first magnetic element 910 has a pair of edges 911 perpendicular to the holder 220. It should be understood that, in this embodiment, the first magnetic element 910 and the second magnetic element 920 both are connected to movable portion 200 by two types of adhesive elements, which are the first adhesive element 1010 and the second adhesive element 1020. For the purpose of illustration, only the first magnetic element 910 is shown in FIG. 5 as an example.

As shown in FIG. 5, a first adhesive element 1010 is disposed between the first magnetic element 910 and the holder 220, wherein the first adhesive element 1010 may be thermosetting adhesive. The second adhesive element 1020 is disposed on the edge 911 of the first magnetic element 910, wherein the second adhesive element 1020 may be ultraviolet adhesive.

Specifically, when the first magnetic element 910 is mounted on the holder 220, the first adhesive element 1010 is applied between the first magnetic element 910 and the holder 220, and the first adhesive element 1010 is cured by thermosetting. Then, a second adhesive element 1020 is applied at the edge 911 of the first magnetic element 910, and the second adhesive element 1020 is cured by ultraviolet curing.

The Young's modulus of the first adhesive element 1010 after curing is greater than the Young's modulus of the second adhesive element 1020 after curing. As a result, with the first magnetic element 910 fixed by two different adhesive elements, it is less likely for the first magnetic element 910 to detach from the holder 200 due to impact, so as to achieve a better fixing effect.

Figure 6A:
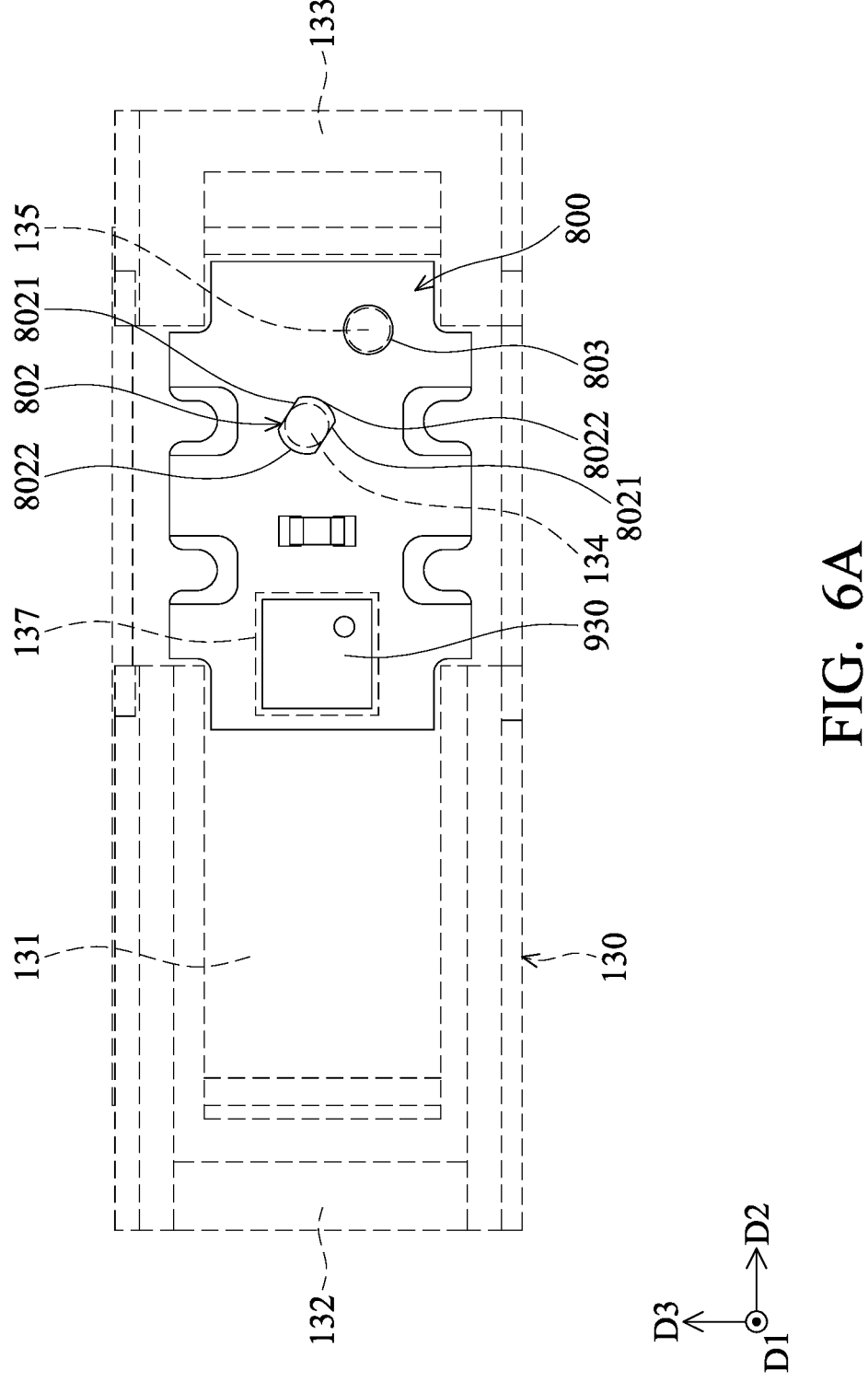
FIG. 6A shows a top view of a base, a circuit component, and a sensing element according to an embodiment of the present disclosure, with the base shown in dash line for illustrative purposes.
Figure 6B:
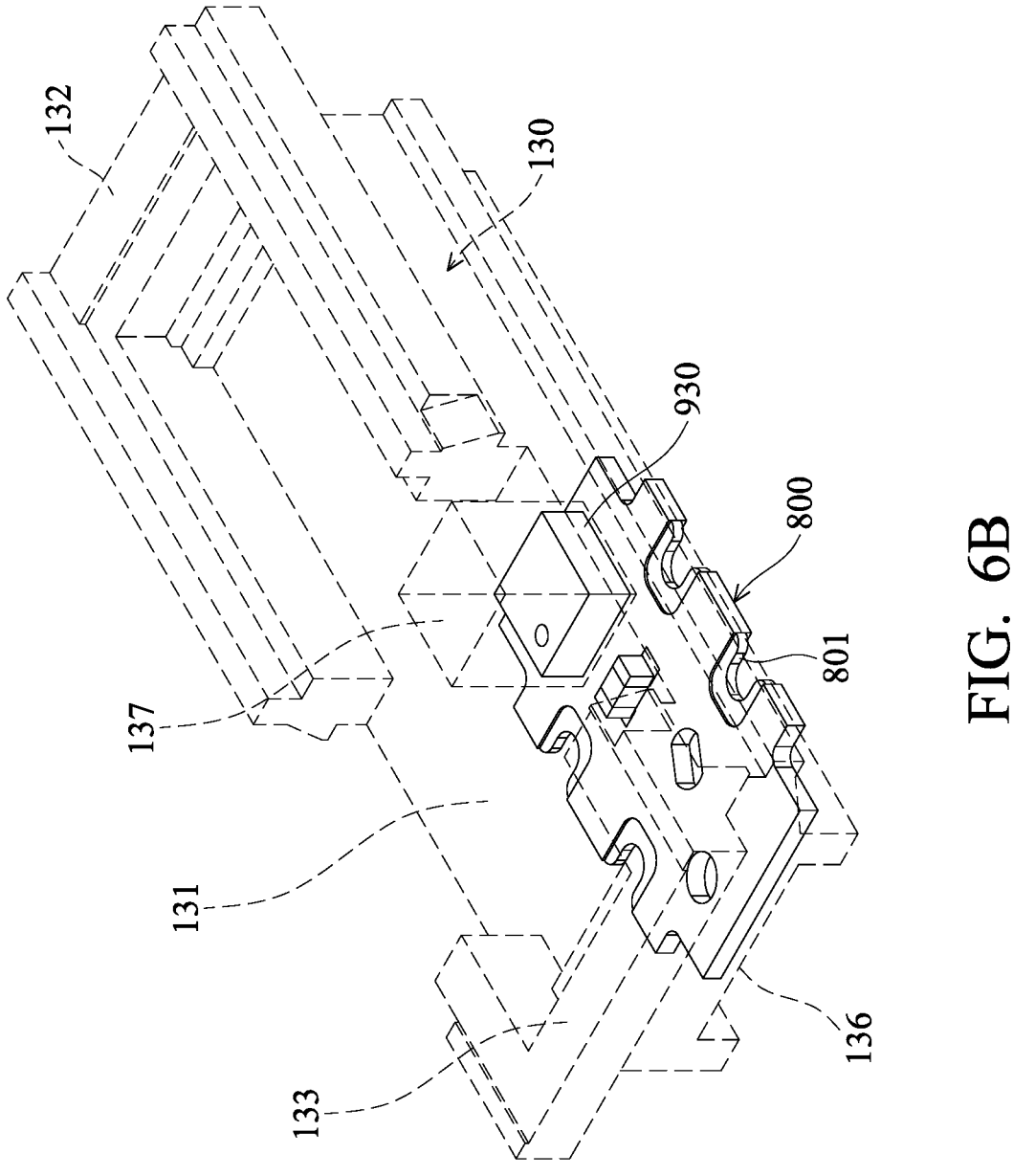
FIG. 6B shows a perspective view of the base, the circuit component, and the sensing element in FIG. 6A, with the base shown in dash line for illustrative purposes.

FIG. 6A shows a top view of the base 130, the circuit component 800, and the sensing element 930 according to an embodiment of the present disclosure, with the base 130 shown in dash line for illustrative purposes. FIG. 6B shows a perspective view of the base 130, the circuit component 800 and the sensing element 930 in FIG. 6A, with the base 130 shown in dash line for illustrative purposes.

Please refer to FIG. 6A and FIG. 6B together, the base 130 includes a plane 131, a first support portion 132, a second support portion 133, a first protrusion 134, a second protrusion 135, a bottom 136, and an opening 137. The circuit component 800 includes a set of electrical connecting portion 801, a first positioning structure 802, and a second positioning structure 803.

As shown in FIG. 6A and FIG. 6B, the plane 131 is located between the first support portion 132 and the second support portion 133. The first support portion 132 and the second support portion 133 protrude upward along the direction of the first axis D1 on both sides of the plane 131. The first support portion 132 and the second support portion 133 may support the holder 220 (FIG. 4A and FIG. 4B).

Please briefly refer back to FIG. 4A and FIG. 4B, the distance between the first support portion 132 and the first end 11 is smaller than the distance between the second support portion 133 and the first end 11. It is noted that a first gap G1 formed between the first support portion 132 and the holder 220 is smaller than a second gap G2 formed between the second support portion 133 and the holder 220. This configuration may prevent the holder 220 near the first end 11 from bending due to holding the optical element (not shown). Thus, the flatness of the structure of the optical element driving mechanism 10 is improved.

Referring back to FIG. 6A and FIG. 6B, the first protrusion 134 and the second protrusion 135 protrude from the bottom 136 toward a direction away from the housing 110 (FIG. 2). The first protrusion 134 and the second protrusion 135 may be cylindrical structures. The circuit component 800 is disposed under the base 130. Specifically, the circuit component 800 is disposed on the bottom 136 of the base 130.

In detail, the first protrusion 134 extends downwards through the first positioning structure 802 of the circuit component 800, and the second protrusion 135 extends downwards through the second positioning structure 803 of the circuit component 800. The opening 137 runs through the bottom 136 from the plane 131. The plane 131 and the bottom 136 are on different levels. The sensing element 930 is electrically connected to the circuit component 800. The sensing element 930 is disposed in the opening 137 of the base 130 to achieve miniaturization of the mechanism. The circuit component 800 is electrically connected to an external circuit (not shown) through the electrical connecting portion 801.

In some embodiments of the present disclosure, the first positioning structure 802 and the second positioning structure 803 may be regarded as two positioning holes on the circuit component 800. As shown in FIG. 6A, the shapes and areas of the first positioning structure 802 and the second positioning structure 803 are different.

Specifically, the first positioning structure 802 includes a pair of straight edges 8021 and a pair of arc-shaped edges 8022. The straight edge 8021 contacts the first protrusion

134 to provide a constrain to the first protrusion 134, which may reduce deviations in positioning the circuit component 800 on the base 130.

The second positioning structure 803 is generally a circular positioning hole. The diameter of the second positioning structure 803 is larger than the diameter of the second protrusion 135. The direction in which the first positioning structure 802 and the second positioning structure 803 are arranged is not parallel to the second axis D2. That is to say, the first positioning structure 802 and the second positioning structure 803 are not aligned in the second axis D2.

The direction in which the first positioning structure 802 and the second positioning structure 803 are arranged is not parallel to the third axis D3. That is to say, the first positioning structure 802 and the second positioning structure 803 are not aligned in the third axis D3. This configuration enables the circuit component 800 to have a better fixing effect.

When viewed along the first axis D1, the sensing element 930 is located on the side of the circuit component 800 that is closer to the first support portion 132. The first positioning structure 802 and the second positioning structure 803 are located on the side of the circuit component 800 that is closer to the second support portion 133.

Figure 7:
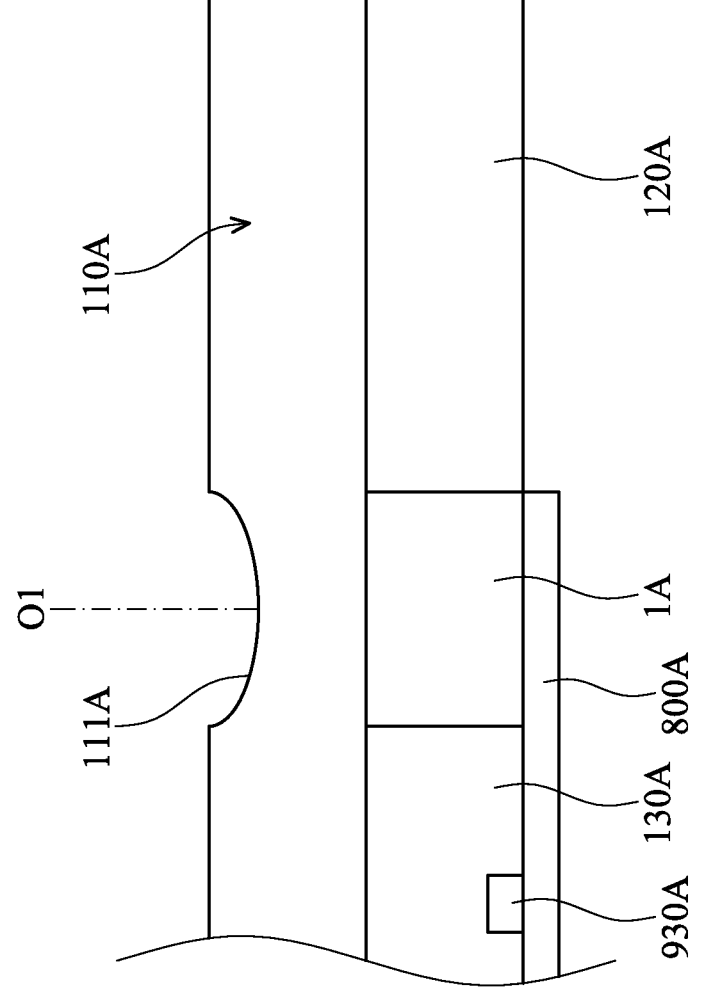
FIG. 7 shows a schematic view of another embodiment in which a sensing element of an optical element driving mechanism shares a circuit component with an optical module.

FIG. 7 shows a schematic view of an embodiment in which the sensing element 930A of the optical element driving mechanism 10A shares a circuit component 800A with an optical module 1A. As shown in FIG. 7, the optical module 1A may be disposed between the base 120A and the base 130A. Light enters the optical module 1A from the opening 111A of the housing 110A. Both the optical module 1A and the sensing element 930A are disposed on the circuit component 800A. That is to say, the optical module 1A and the sensing element 930A share the circuit component 800A. This configuration enables the optical element driving mechanism 10A to reduce the number of elements.

Figure 8A:
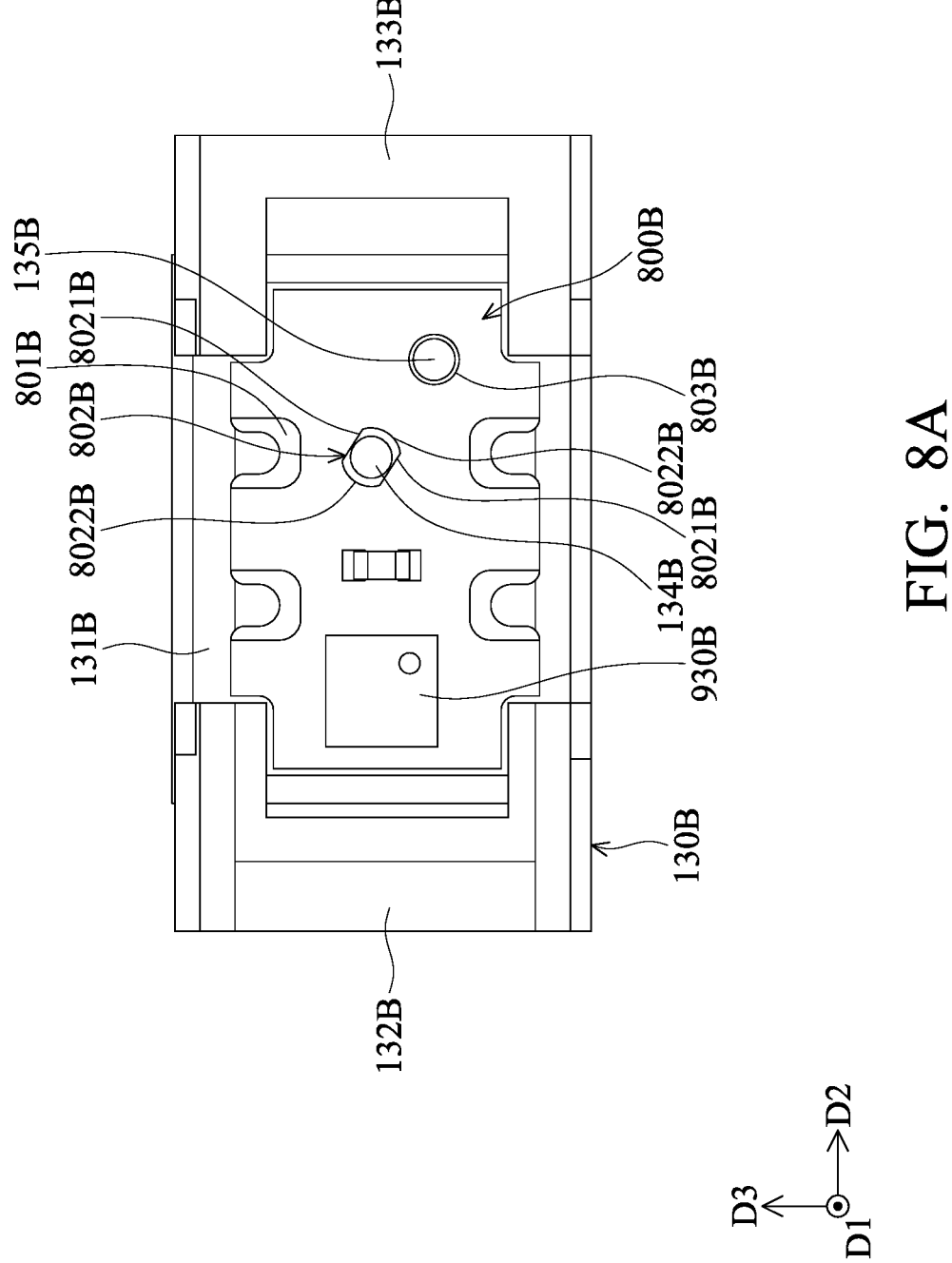
FIG. 8A shows a top view of a base, a circuit component, and a sensing element according to another embodiment of the present disclosure.
Figure 8B:
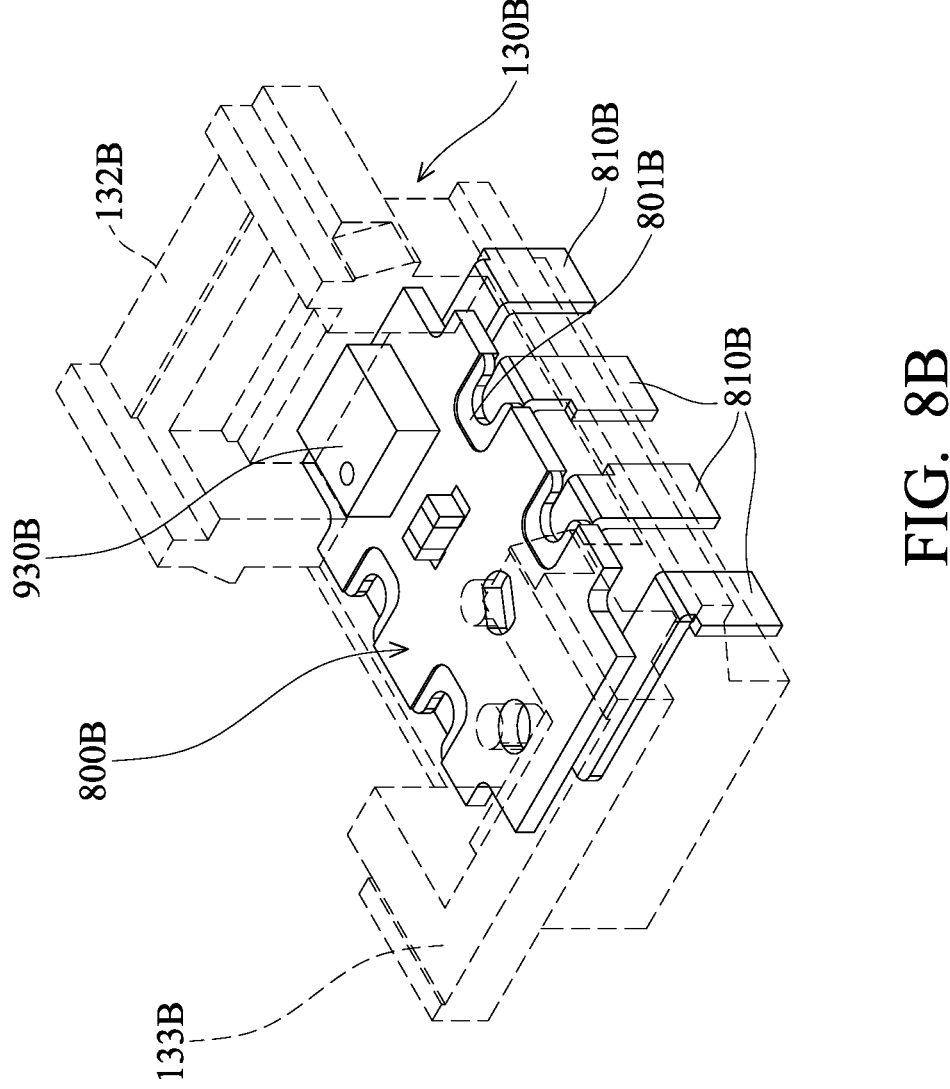
FIG. 8B shows a perspective view of the base, the circuit component, and the sensing element in FIG. 8A, with the base shown in dash line to show a terminal embedded in the base.

FIG. 8A shows a top view of a base 130B, a circuit component 800B, and a sensing element 930B according to another embodiment of the present disclosure. FIG. 8B shows a perspective view of the base 130B, the circuit component 800B, and the sensing element 930B in FIG. 8A, with the base 130B shown in dash line to show a terminal 810B embedded in the base 130B.

Please refer to FIG. 8A and FIG. 8B together, the base 130B includes a plane 131B, a first support portion 132B, a second support portion 133B, a first protrusion 134B, and a second protrusion 135B. The circuit component 800B includes a set of electrical connecting portion 801B, a first positioning structure 802B, and a second positioning structure 803B. The sensing element 930B is electrically connected to the circuit component 800B.

As shown in FIG. 8A and FIG. 8B, the plane 131B is located between the first support portion 132B and the second support portion 133B. The first support portion 132B and the second support portion 133B protrude upward along the direction of the first axis D1 on both sides of the plane 131B.

The embodiment shown in FIGS. 8A to 8B differs from the embodiment shown in FIGS. 6A to 6B in that the circuit component 800B is disposed on the plane 131B, and the terminal 810B is partially embedded in the base 130B, to electrically connect to the electrical connecting portion 801B of the circuit component 800B. In addition, part of the terminal 810B is exposed from the base 130B to be electrically connected to an external circuit (not shown).

Please continue to refer to FIG. 8A and FIG. 8B, the first protrusion 134B and the second protrusion 135B protrude in the direction of the first axis D1 from the plane 131B toward the housing 110 (FIG. 2). The first protrusion 134B extends through the first positioning structure 802B of the circuit component 800B. The second protrusion 135B extends through the second positioning structure 803B of the circuit component 800B.

Similar to the embodiment shown in FIGS. 6A to 6B, in the embodiment shown in FIGS. 8A to 8B, the first positioning structure 802B and the second positioning structure 803B may be regarded as two positioning holes on the circuit member 800B. The shapes and areas of the first positioning structure 802B and the second positioning structure 803B are different.

Specifically, the first positioning structure 802B includes a pair of straight edges 8021B and a pair of arc-shaped edges 8022B. The straight edge 8021B is in contact with the first protrusion 134B to provide a constrain to the first protrusion 134B, which may reduce deviations in positioning the circuit component 800B on the base 130.

The second positioning structure 803B is generally a circular positioning hole. The diameter of the second positioning structure 803B is larger than the diameter of the second protrusion 135B. The direction in which the first positioning structure 802B and the second positioning structure 803B are arranged is not parallel to the second axis D2, and the direction in which the first positioning structure 802B and the second positioning structure 803B are arranged is not parallel to the third axis D3.

That is to say, the first positioning structure 802B and the second positioning structure 803B are not aligned in the second axis D2, and the first positioning structure 802B and the second positioning structure 803B are not aligned in the third axis D3. The circuit component 800B may be fixed on the plane 131B of the base 130B by applying adhesive elements (not shown) on the first protrusion 134B and the second protrusion 135B.

Figures 9A, 9B:
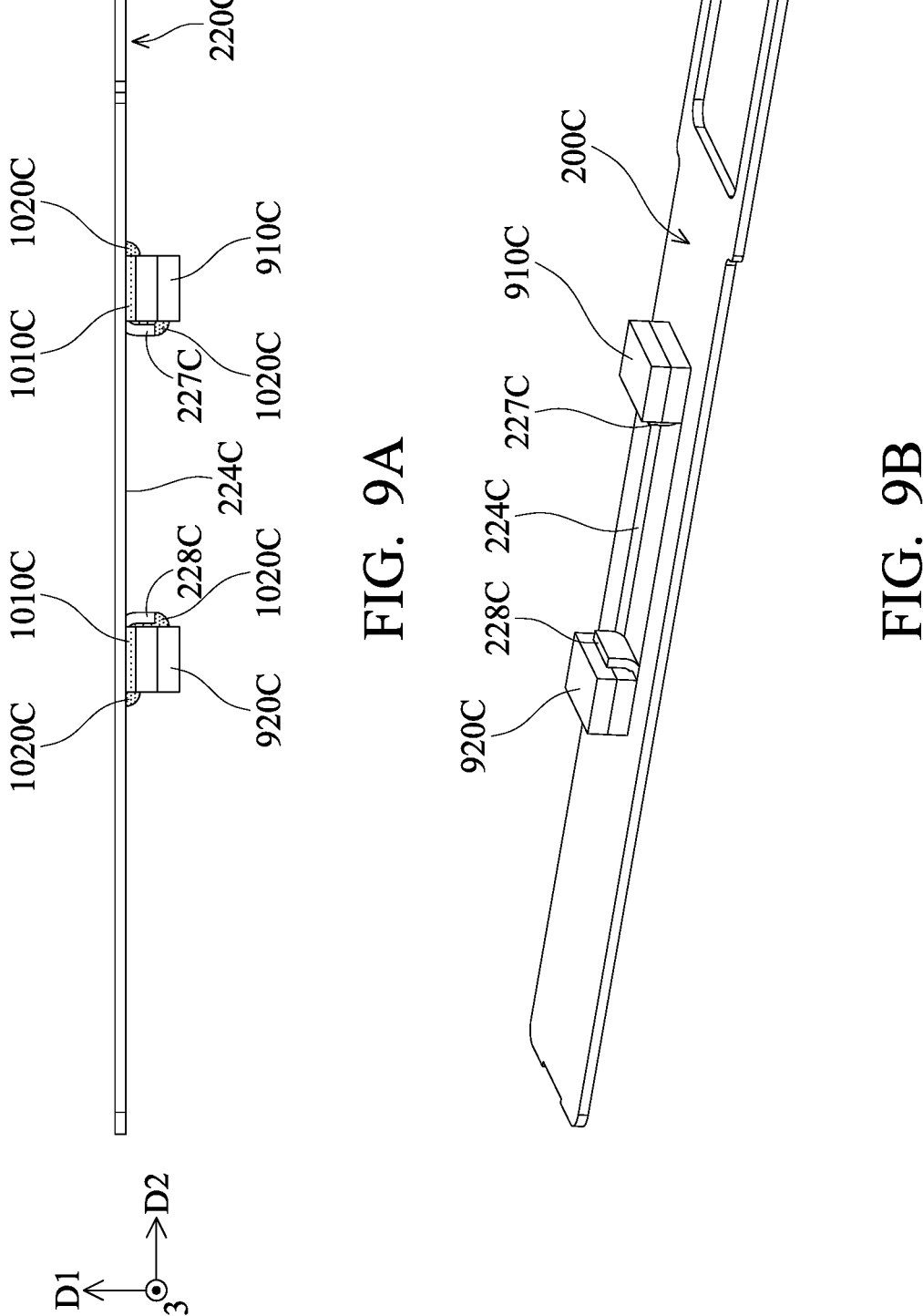
FIG. 9A shows a side view of a holder, a first magnetic element, and a second magnetic element according to another embodiment of the present disclosure.
FIG. 9B shows an upside down perspective view of the holder, the first magnetic element and the second magnetic element in FIG. 9A.

FIG. 9A shows a side view of a holder 220C, a first magnetic element 910C, and a second magnetic element 920C according to another embodiment of the present disclosure. FIG. 9B shows an upside down perspective view of the holder 220C, the first magnetic element 910C and the second magnetic element 920C in FIG. 9A.

In the embodiment shown in FIG. 9A and FIG. 9B, the holder 220C further includes a first fixed structure 227C and a second fixed structure 228C. The first fixed structure 227C and the second fixed structure 228C extend from both sides of the first opening 224C along the first axis D1 toward the base 130 (FIG. 2).

The first magnetic element 910C is disposed on the first fixed structure 227C, the second magnetic element 920C is disposed on the second fixed structure 228C. The height of the first magnetic element 910C in the first axis D1 is greater than the height of the first fixed structure 227C in the first axis D1. The height of the second magnetic element 920C in the first axis D1 is greater than the height of the second fixed structure 228C in the first axis D1.

Both the first magnetic element 910C and the second magnetic element 920C are connected to the holder 220C by the first adhesive element 1010C and the second adhesive element 1020C. For illustrative purposes, the first adhesive element 1010C and the second adhesive element 1020C are only shown in FIG. 9A as an example.

As shown in FIG. 9A, a first adhesive element 1010C is disposed between the first magnetic element 910C and the holder 220C, wherein the first adhesive element 1010C may be thermosetting adhesive. The second adhesive element 1020C is disposed around the first magnetic element 910C and between the first magnetic element 910C and the first fixed structure 227C, wherein the second adhesive element 1020C may be ultraviolet adhesive.

Specifically, when mounting the first magnetic element 910C to the holder 220C, the first adhesive element 1010C may firstly be applied between the first magnetic element 910C and the holder 220C. Then, the first adhesive element 1010C may be cured by thermosetting. Then, the second adhesive element 1020C may be applied around the first magnetic element 910C and between the first magnetic element 910C and the first fixed structure 227C. The second adhesive element 1020C may be cured by ultraviolet curing.

The Young's modulus of the first adhesive element 1010C after curing is greater than the Young's modulus of the second adhesive element 1020C after curing. As a result, with the first magnetic element 910C fixed by two different adhesive elements, it is less likely for the first magnetic element 910C to detach from the holder 200C due to impact, so as to achieve a better fixing effect. In addition, the second magnetic element 920C is also fixed by the first adhesive element 1010C and the second adhesive element 1020C in a similar manner.

To sum up, the optical element driving mechanism of the present disclosure includes a sensing assembly, which may determine whether the movable portion is in the first position, so as to achieve closed-loop control. The first magnetic element and the second magnetic element are fixed on the movable portion by two different curing manners to strengthen the fixation between the magnetic element and the movable portion.

The ordinal numbers in this specification and the claim, such as "first", "second", etc., do not have a sequential relationship between each other, and they are only used to distinguish two different components with the same name.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical element driving mechanism, comprising:
   a movable portion connected with an optical element;
   a fixed portion, wherein the movable portion is movable relative to the fixed portion; and a sensing assembly sensing whether the movable portion is in a first position relative to the fixed portion, wherein the movable portion comprises a first opening, a first fixed structure, and a second fixed structure, and the sensing assembly comprises a first magnetic element and a second magnetic element, wherein the first fixed structure and the second fixed structure extend in a first axis from both sides of the first opening, the first magnetic element is disposed on the first fixed structure, and the second magnetic element is disposed on the second fixed structure.

2. The optical element driving mechanism as claimed in claim 1, wherein the movable portion further comprises a second opening, and an area of the first opening is different from an area of the second opening.

3. The optical element driving mechanism as claimed in claim 2, wherein the first opening is larger than the second opening.

4. The optical element driving mechanism as claimed in claim 2, wherein the first magnetic element and the second magnetic element are disposed on both sides of the first opening of the movable portion, the second magnetic element is disposed between the first opening and the second opening.

5. The optical element driving mechanism as claimed in claim 1, further comprising a circuit component, the fixed portion comprises a plane, and the sensing assembly comprises a sensing element, wherein the circuit component is disposed on the plane of the fixed portion, the sensing element is disposed on the circuit component.

6. The optical element driving mechanism as claimed in claim 5, wherein the circuit component comprises a first positioning structure and a second positioning structure, and the first positioning structure and the second positioning structure are different in area and shape.

7. The optical element driving mechanism as claimed in claim 6, wherein the fixed portion comprises a first end and a second end, when viewed along the first axis, a direction extending from the first end to the second end defines a second axis perpendicular to the first axis, and a direction in which the first positioning structure and the second positioning structure are arranged is not parallel to the second axis, and a distance between the sensing element and the first end is smaller than a distance between the first positioning structure and the first end.

8. The optical element driving mechanism as claimed in claim 6, wherein the fixed portion comprises a first protrusion and a second protrusion, the first protrusion extends through the first positioning structure, the second protrusion extends through the second positioning structure.

9. The optical element driving mechanism as claimed in claim 8, wherein the first positioning structure comprises two edges, and the edges of the first positioning structure are in contact with the first protrusion.

10. The optical element driving mechanism as claimed in claim 1, wherein the first magnetic element and the second magnetic element are disposed on the movable portion, and the magnetic poles of the first magnetic element and the second magnetic element are arranged in opposite directions.

11. The optical element driving mechanism as claimed in claim 1, further comprising a first adhesive element, wherein the first adhesive element is disposed between the first magnetic element and the movable portion, the first adhesive element is cured by thermosetting.

12. The optical element driving mechanism as claimed in claim 11, further comprising a second adhesive element, the second adhesive element is disposed on an edge of the first magnetic element, the second adhesive element is cured by ultraviolet curing.

13. The optical element driving mechanism as claimed in claim 12, wherein the Young's modulus of the first adhesive element after curing is greater than the Young's modulus of the second adhesive element after curing.

14. The optical element driving mechanism as claimed in claim 1, wherein a height of the first magnetic element in the first axis is greater than a height of the first fixed structure in the first axis, a height of the second magnetic element in the first axis is greater than a height of the second fixed structure in the first axis, the first axis is perpendicular to a direction from the first magnetic element to the second magnetic element.

15. An optical element driving mechanism, comprising:
a movable portion connected with an optical element;
a fixed portion, wherein the movable portion is movable relative to the fixed portion; and
a sensing assembly sensing whether the movable portion is in a first position relative to the fixed portion,
wherein the fixed portion comprises a first end, a second end, a first support portion, and a second support portion, the first end is opposite to the second end, and a distance between the sensing assembly and the first end is smaller than a distance between the sensing assembly and the second end, a distance between the first support portion and the first end is smaller than a distance between the second support portion and the first end, a first gap is formed between the first support portion and the movable portion, a second gap is formed between the second support portion and the movable portion.

16. The optical element driving mechanism as claimed in claim 15, wherein the first gap is smaller than the second gap, and the first gap is closer to the first end than the second gap.

17. An optical element driving mechanism, comprising:
a movable portion connected with an optical element;
a fixed portion, wherein the movable portion is movable relative to the fixed portion;
a sensing assembly sensing whether the movable portion is in a first position relative to the fixed portion; and
a circuit component,
wherein the fixed portion comprises an opening, a plane, and a bottom, the sensing assembly comprises a sensing element, wherein the opening runs through the bottom from the plane, the plane and the bottom of the fixed portion are on different levels, the circuit component is disposed on the bottom of the fixed portion, the sensing element is electrically connected to the circuit component, and the sensing element is positioned in the opening.

18. The optical element driving mechanism as claimed in claim 17, wherein the sensing element and an optical module are both disposed on the circuit component.

19. The optical element driving mechanism as claimed in claim 1, wherein the fixed portion comprises a first end, a second end, a first side wall, and a second side wall, the first end is opposite to the second end, and a distance between the sensing assembly and the first end is smaller than a distance between the sensing assembly and the second end, a distance between the first side wall and the first end is smaller than a distance between the second side wall and the first end, and a height of the first side wall in a first axis is greater than a height of the second side wall in the first axis, and the first axis is perpendicular to a direction extending from the first end to the second end.

\* \* \* \* \*